(12) United States Patent
Olson et al.

(10) Patent No.: US 7,869,304 B2
(45) Date of Patent: Jan. 11, 2011

(54) METHOD AND APPARATUS FOR PRE-INVERSION NOISE ATTENUATION OF SEISMIC DATA

(75) Inventors: Robert A. Olson, Houston, TX (US);
Stephen K. Chiu, Katy, TX (US);
Charles W. Emmons, Pasadena, TX (US)

(73) Assignee: ConocoPhillips Company, Houston, TX (US)

( * ) Notice: Subject to any disclaimer, the term of this patent is extended or adjusted under 35 U.S.C. 154(b) by 623 days.

(21) Appl. No.: 11/855,776

(22) Filed: Sep. 14, 2007

(65) Prior Publication Data

US 2009/0073808 A1    Mar. 19, 2009

(51) Int. Cl.
*G01V 1/00*    (2006.01)
(52) U.S. Cl. ............................... 367/38; 367/41; 367/43
(58) Field of Classification Search .................. 367/38, 367/41, 43, 45, 189
See application file for complete search history.

(56) References Cited

U.S. PATENT DOCUMENTS

| | | | |
|---|---|---|---|
| 4,493,067 A | | 1/1985 | Thomas et al. |
| 4,982,374 A | | 1/1991 | Edington et al. |
| 5,550,786 A | * | 8/1996 | Allen ........................... 367/48 |
| 5,703,833 A | * | 12/1997 | Allen ........................... 367/46 |
| 5,715,213 A | | 2/1998 | Allen |
| 5,719,821 A | | 2/1998 | Sallas et al. |
| 5,721,710 A | * | 2/1998 | Sallas et al. .................... 367/41 |
| 6,161,076 A | * | 12/2000 | Barr et al. ...................... 702/17 |
| 6,519,533 B1 | * | 2/2003 | Jeffryes ......................... 702/17 |
| 6,766,256 B2 | * | 7/2004 | Jeffryes ......................... 702/17 |
| 6,865,488 B2 | | 3/2005 | Moerig et al. |
| 7,295,490 B1 | * | 11/2007 | Chiu et al. ..................... 367/48 |
| 7,436,734 B2 | * | 10/2008 | Krohn ........................... 367/43 |

FOREIGN PATENT DOCUMENTS

WO    WO 2005/019865    3/2005

OTHER PUBLICATIONS

U.S. Patent Application entitled System and Method of Phase Encoding for High Fidelity Vibratory Seismic Data; U.S. Appl. No. 11/489,891, filed Jul. 20, 2006; Inventors: Stephen K. Chiu; Peter M. Eick; and Charles W. Emmons; Assignee: ConocoPhillips Company.
U.S. Patent Application entitled Direct Time Lapse Inversion of Seismic Data; U.S. Appl. No. 11/672,000, filed Feb. 6, 2007; Inventors: Phil Anno and Partha Routh; Assignee: ConocoPhillips Company.
U.S. Patent Application entitled Dynamic Source Parameter Selection for Seismic Vibrator Data Acquisition; U.S. Appl. No. 11/677,438, filed Feb. 21, 2007; Inventors: Peter M. Eick, Joel D. Brewer, Stephen K. Chiu, and Charles W. Emmons; Assignee: ConocoPhillips Company.

* cited by examiner

*Primary Examiner*—Mark Hellner

(57) ABSTRACT

A method and apparatus for pre-inversion noise attenuation of seismic data. The method can generally comprise: (a) acquiring seismic data including receiver data corresponding to vibratory signals simultaneously generated by the multiple sources and detected by at least one of the receivers at a location remote from the sources and source data corresponding to the vibratory signals detected at a location in proximity to the sources; (b) attenuating noise present within at least a portion of the receiver data to generate corrected receiver data; and (c) inverting the corrected receiver data with the source data to separate the vibratory signals.

17 Claims, 16 Drawing Sheets

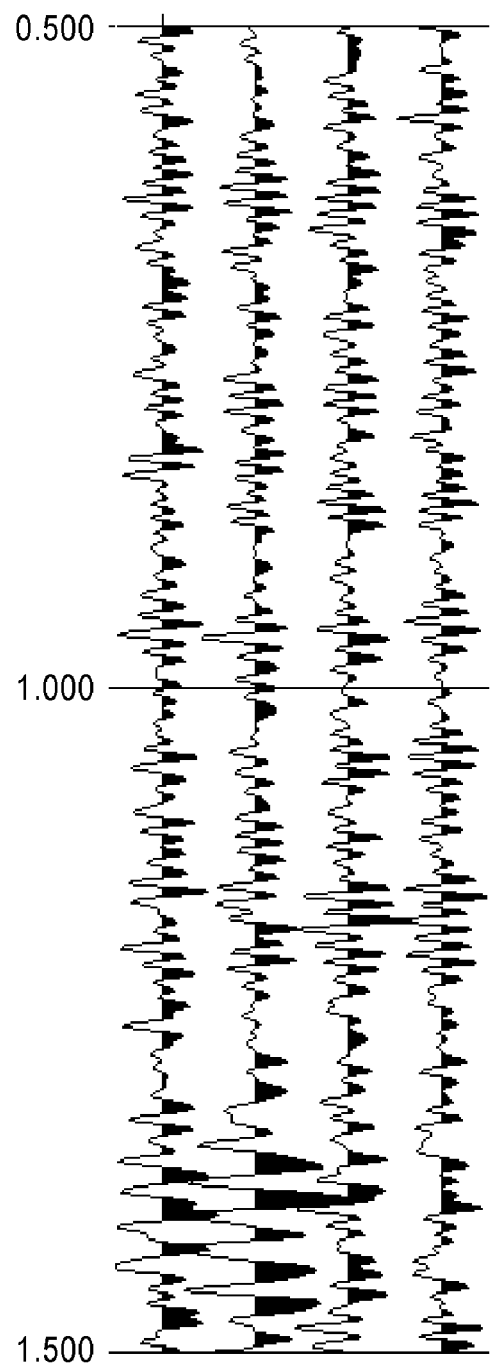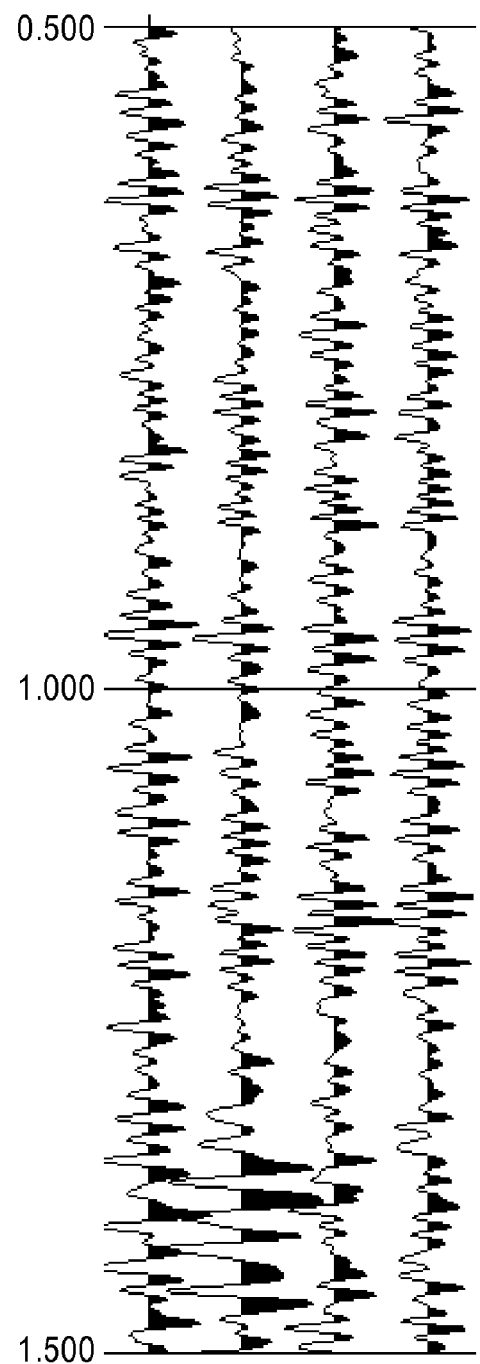
FIG. 12  FIG. 13

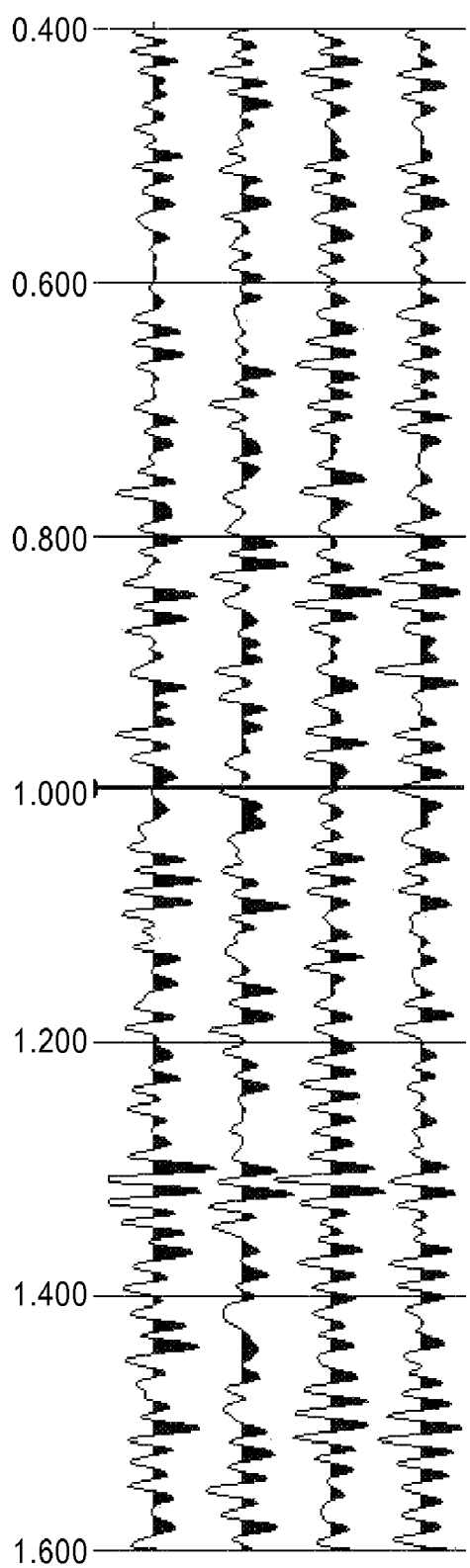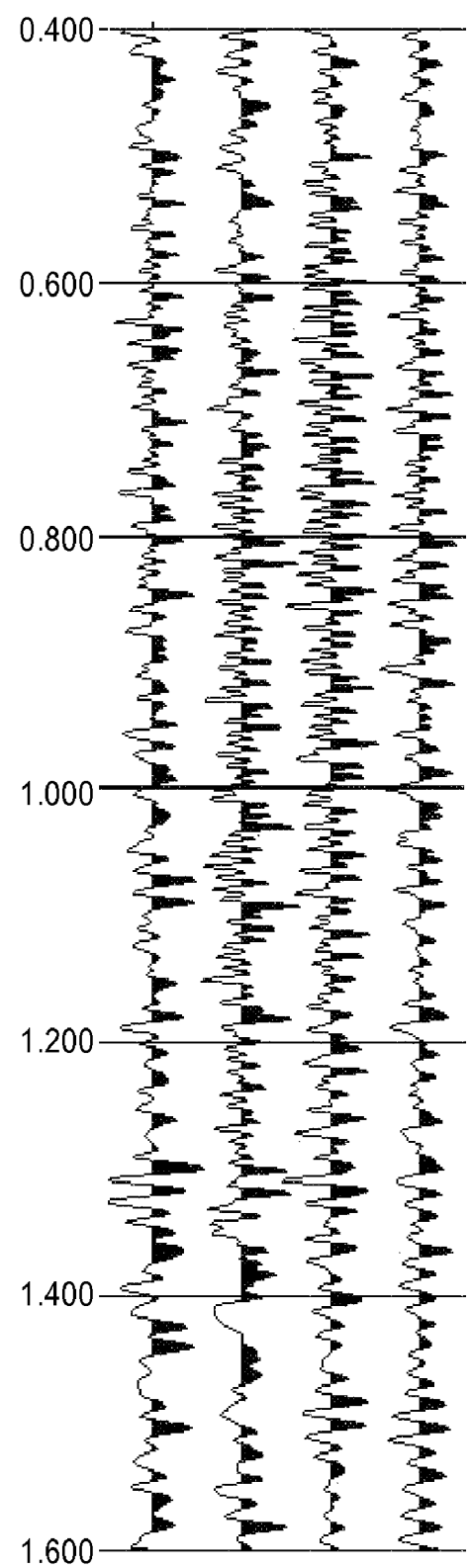
FIG. 15  FIG. 16

METHOD AND APPARATUS FOR PRE-INVERSION NOISE ATTENUATION OF SEISMIC DATA

BACKGROUND OF THE INVENTION

1. Field of the Invention

Embodiments of the present invention relate generally to methods and apparatuses for attenuating noise in seismic data. Particularly, various embodiments of the present invention provide pre-inversion noise attenuation of seismic data corresponding to multiple source and receiver seismic systems.

2. Description of the Related Art

Multiple source and receiver seismic systems, often referred to in the art as high fidelity vibratory source (HFVS) systems, can be utilized to generate seismic surveys of subterranean regions of the earth to facilitate in the recovery of hydrocarbon resources. Multiple source and receiver seismic systems simultaneously generate a plurality of vibrations which, after reflecting or refracting from subterranean features, are measured by a plurality of receivers. Utilizing the receiver measurements and measurements made at the vibrating sources, a matrix inversion is performed to separate the signals for each source-receiver path. Prior art systems attempt to correct for various noise that may be present in the measurements by employing noise attenuation functions after the matrix inversion and signal separation. Unfortunately, such post-inversion noise attenuation of seismic data is often unable to properly compensate for measured noise.

SUMMARY

In one embodiment of the present invention, there is provided a method for attenuating noise in a multiple source and receiver seismic system. The method can generally comprise: (a) acquiring seismic data including receiver data corresponding to vibratory signals simultaneously generated by the multiple sources and detected by at least one of the receivers at a location remote from the sources and source data corresponding to the vibratory signals detected at a location in proximity to the sources; (b) attenuating noise present within at least a portion of the receiver data to generate corrected receiver data; and (c) inverting the corrected receiver data with the source data to separate the vibratory signals.

In another embodiment, there is provided a processing system for attenuating noise in a multiple source and receiver seismic system. The processing system can generally comprise a memory and a processor coupled with the memory. The memory is operable to store seismic data including receiver data corresponding to vibratory signals simultaneously generated by the multiple sources and detected by at least one of the receivers at a location remote from the sources and source data corresponding to the vibratory signals detected at a location in proximity to the sources. The processor is operable to acquire the stored seismic data, attenuate noise present within the acquired receiver data to generate corrected receiver data, and invert the corrected receiver data with the source data to separate the vibratory signals.

In another embodiment, there is provided a computer program for attenuating noise in a multiple source and receiver seismic system. The computer program is stored on a computer-readable medium for operating a processor and comprises a plurality of code segments operable to: acquire seismic data including receiver data corresponding to vibratory signals simultaneously generated by the multiple sources and detected by at least one of the receivers at a location remote from the sources and source data corresponding to the vibratory signals detected at a location in proximity to the sources; attenuate noise present within the receiver data to generate corrected receiver data; and invert the corrected receiver data with the source data to separate the vibratory signals.

BRIEF DESCRIPTION OF THE DRAWING FIGURES

Embodiments of the present invention are described in detail below with reference to the attached drawing figures, wherein:

FIG. 12 is an exemplary inversion of the seismic data of FIG. 11 without pre-inversion noise attenuation, but including 60 Hz noise attenuation after inversion;

FIG. 13 is an exemplary inversion of the seismic data of FIG. 11 with pre-inversion noise attenuation;

FIG. 15 is an exemplary inversion of the seismic data of FIG. 14 including pre-inversion noise attenuation;

FIG. 16 is an exemplary inversion of the seismic data of FIG. 14 including post-inversion noise attenuation;

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
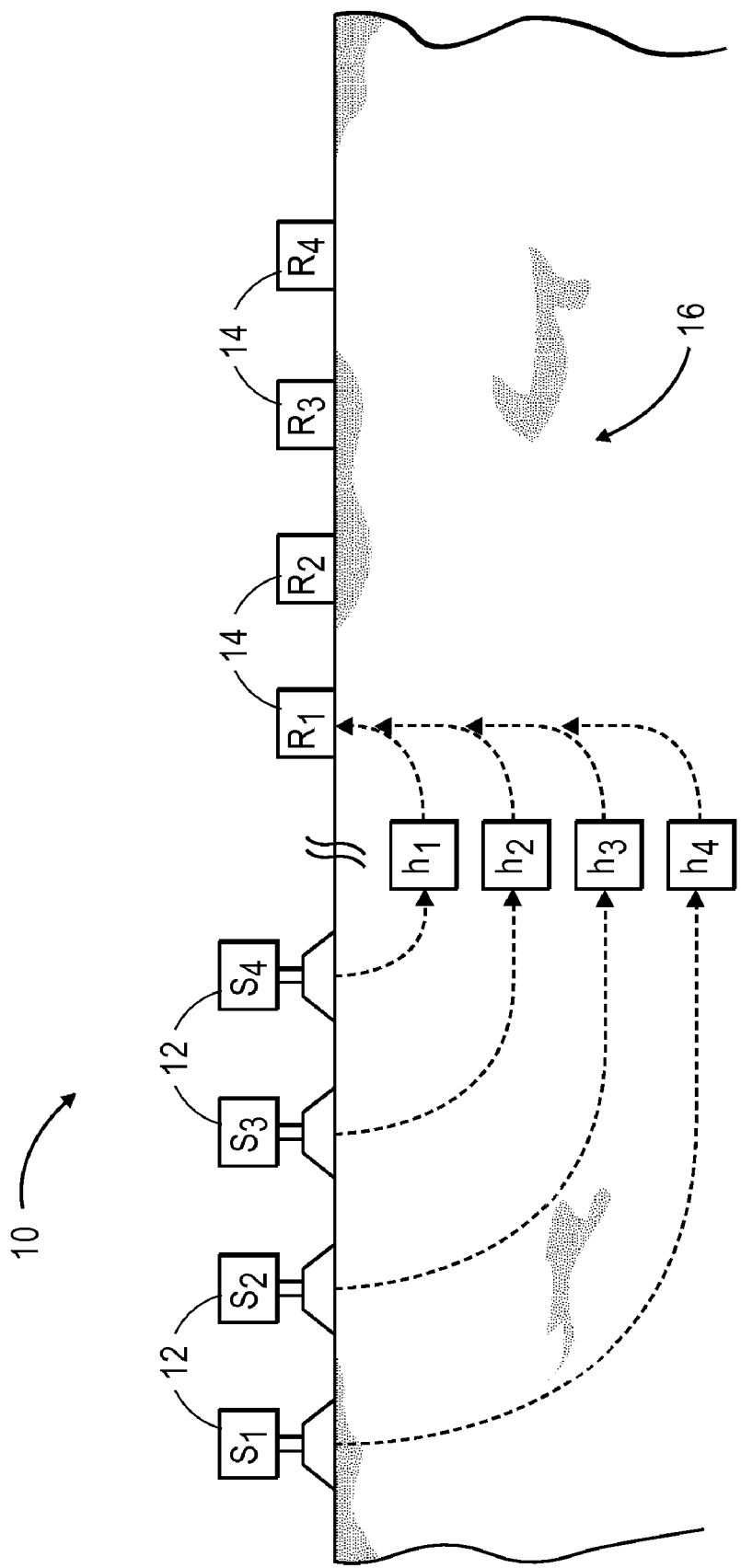
FIG. 1 is an environmental view of a multiple source and receiver seismic system operable to be utilized by embodiments of the present invention.

Referring initially to FIG. 1, an exemplary seismic system 10 is illustrated that can generate data for use by various embodiments of the present invention. The seismic system 10 includes a plurality of sources 12 and receivers 14 that can be positioned in a desired configuration to perform a seismic survey of a subterranean region 16. Each of the sources 12 can be operable to impart a vibratory signal into the earth for reflection or refraction off portions of the subterranean region 16 for detection by one or more of the receivers 14. Some receivers and other detection elements can be positioned in proximity to the sources 12 while the receivers 14 can be positioned away from the sources 12 to facilitate in signal separation, as is discussed in more detail below. The sources 12 and receivers 14 can comprise any element or combination of elements operable to perform these functions, including seismic vibrators and geophones.

Figure 2:
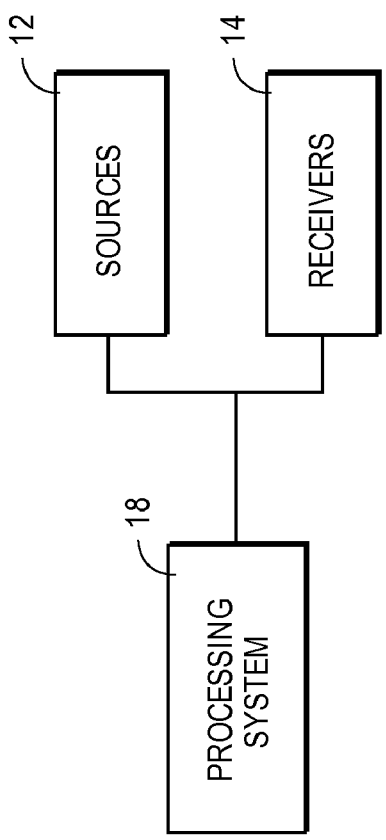
FIG. 2 is a block diagram illustrating a processing system coupled with sources and receives associated with the seismic system of FIG. 1.
Figure 3:
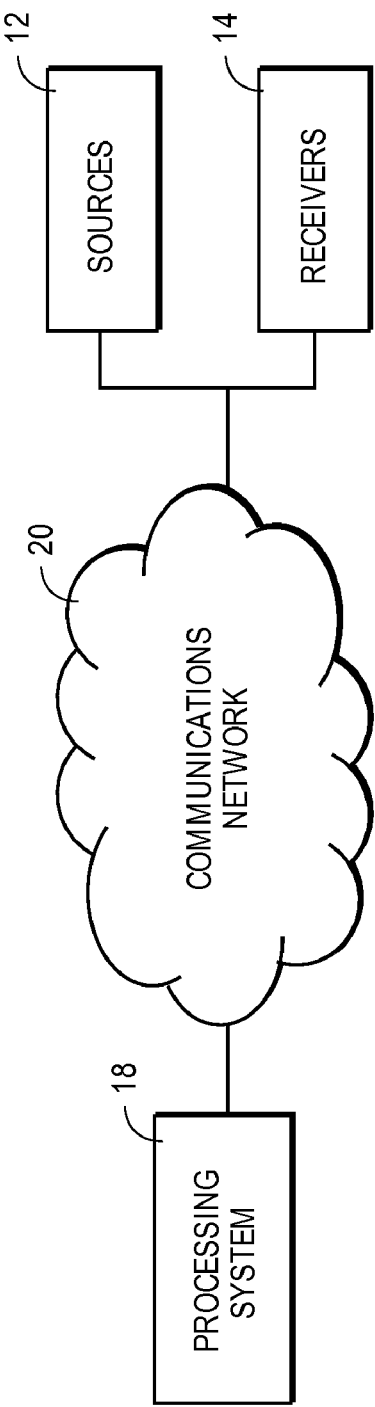
FIG. 3 is a block diagram illustrating the processing system coupled with the sources and receives of FIG. 1 through a communications network.

Referring to FIGS. 2-3, a processing system 18 operable to be utilized by embodiments of the present invention is illustrated. In some embodiments, the processing system 18 can be operable to directly couple with the sources 12 and receivers 14 while in other embodiments the processing system 18 can be operable to communicate with the sources 12 and receivers 14 through a communications network 20 such as a local area network or the internet. However, in some embodiments the processing system 18 is not necessarily coupled with the sources 12 and receivers 14 in any manner, as is discussed in more detail below.

Figure 4:
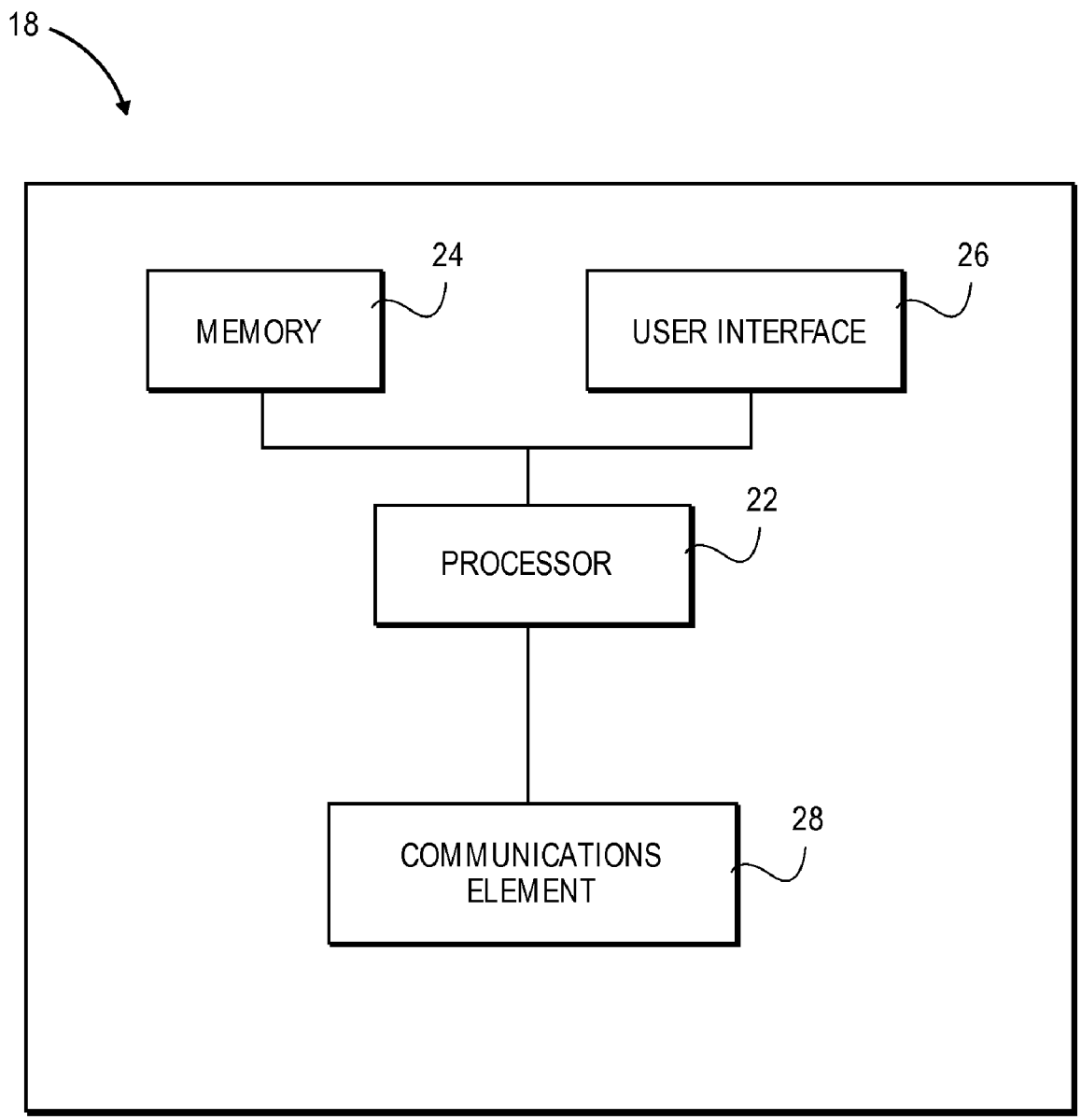
FIG. 4 is a block diagram showing some of the components of the processing system of FIGS. 2-3.
Figure 5:
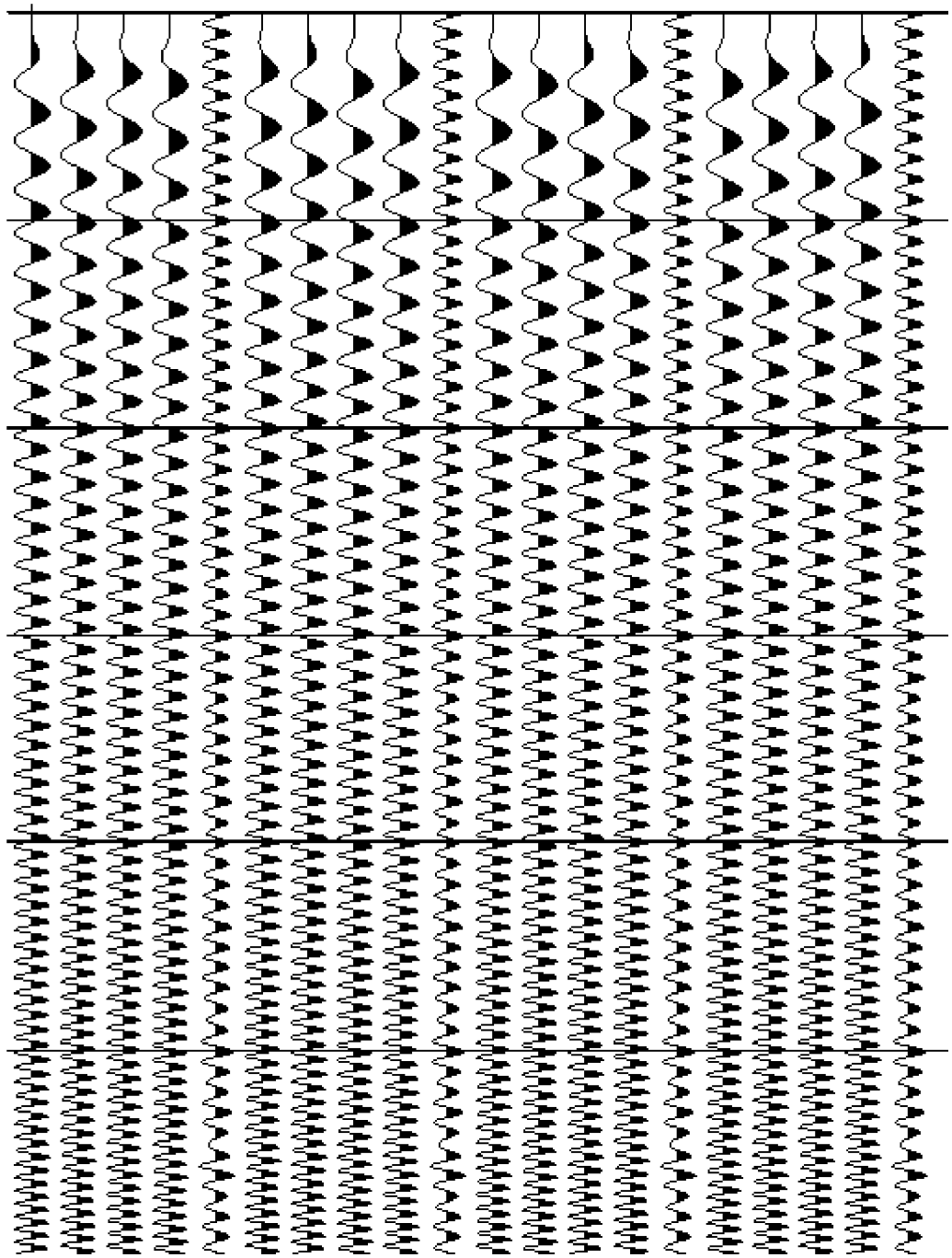
FIG. 5 is exemplary seismic data including a 20 Hz noise signal.

Referring to FIG. 4, various elements of the processing system 18 are illustrated. In some embodiments, the processing system 18 can include a processor 22, a memory 24, a user interface 26, and a communications element 28. The processor 22 can be generally operable to process data. The processor 22 can comprise various computing and control elements such as microprocessors; microcontrollers; programmable logic devices such as field programmable gate arrays; computing devices such as personal computers, portable computing equipment, servers, and distributed computing elements; discrete analog and digital logic; digital signal processors; application specific integrated circuits; combinations thereof, and the like. In some embodiments, the processor 22 can comprise a plurality of computing elements such that one or more of the functions discussed below can be implemented utilizing a first computing element and one or more other functions can be implemented utilizing a second computing element.

The memory 24 is operable to couple with the processor 22 and store data such as seismic data generated by the seismic system 10 and processing system 18. The memory 24 can be a computer-readable medium and comprise various memory elements such as electronic, magnetic, optical electro-magnetic, infrared, or semi-conductor based memory elements. More specific, although not inclusive, examples of the computer-readable medium include the following: an electrical connection having one or more wires, a portable computer diskette, a random access memory (RAM), a read-only memory (ROM), an erasable, programmable, read-only memory (EPROM or Flash memory), an optical fiber, a portable compact disc (CD), a digital video disc (DVD, HD-DVD), a magnetic tape, combinations thereof, and the like.

In some embodiments, at least portions of the memory 24 can be configured as a removable memory element operable to be removably coupled with the processor 22. In such embodiments, the memory 24 can be operable to directly or indirectly couple with the sources 12, receivers 14, and/or various seismic equipment associated therewith, to acquire and store seismic data generated by the seismic system 10. After acquiring seismic data, the memory 24 can be transported to the processor 22 for coupling therewith.

In various embodiments, the memory 24 can include a computer program operable to control functions of the processing system 18. The memory 24 can comprise a plurality of memories such that the computer program can be stored on one memory while acquired seismic data can be stored on another memory. The computer program can comprise instructions for implementing functions in the processing system 18 and/or other associated devices such that the program is not limited to functioning and/or controlling only the processing system 18.

The program can comprise various code segments, which each can include one or more instructions, one or more instruction lists, only a portion of an instruction list, and/or only a portion of an instruction. Code segments can include overlapping lists of instructions—that is, a first code segment can include at least portions of instructions A and B, and a second code segment can include at least portions of instructions B and C. Each code segment can be embodied as human-readable source code or script, as machine-readable object code, and/or as one or more machine-executable files such as compiled source code. Further, the computer program can comprise one or more computer programs each including any number of code segments to perform any of the functions disclosed herein.

However, embodiments of the present invention can be implemented in hardware, software, firmware, and/or combinations thereof and are not limited to the computer program and processing system 18 discussed herein. The computer program and processing system 18 are merely examples of a program and equipment that can be used to implement embodiments of the present invention and can be replaced with other software and/or equipment without departing from the scope of the present teachings.

The user interface 26 enables users, third parties, or other devices to share information with the processing system 18. The user interface 26 can comprise one or more functionable inputs such as buttons, switches, a keyboard, scroll wheels, and the like; a touch screen; voice recognition elements such as a microphone; pointing devices such as mice, touchpads, trackballs, and styluses; combinations thereof, and the like. Further, the user interface 26 can comprise wired or wireless data transfer elements such as removable memory including the memory 24, data transceivers, and the like, to enable the user and other devices or parties to remotely interface with the processing system 18.

The user interface 26 can be operable to provide various information to the user utilizing a display or other visual or audio elements such as a speaker. Thus, the user interface 26 enables the user and the processing system 18 to exchange information. The display can comprise conventional black and white, monochrome, or color display elements including CRT, TFT, and LCD devices.

The communications element 28 enables the processing system 18 to communicate with other devices through a communication network, such as the Internet, a local area network, a wide area network, an ad hoc or peer to peer network, or a direct connection such as a USB, Firewire, or Bluetooth connection, and the like. In various embodiments the communications element 28 can enable the processing system 18 to wirelessly communicate with communications networks utilizing wireless data transfer methods such as WiFi (802.11), Wi-Max, Bluetooth, ultra-wideband, infrared, cellular telephony, radio frequency, and the like. However, the communications element 28 can couple with the communications network utilizing wired connections, such as an Ethernet cable, and is not limited to wireless methods.

Figure 21:
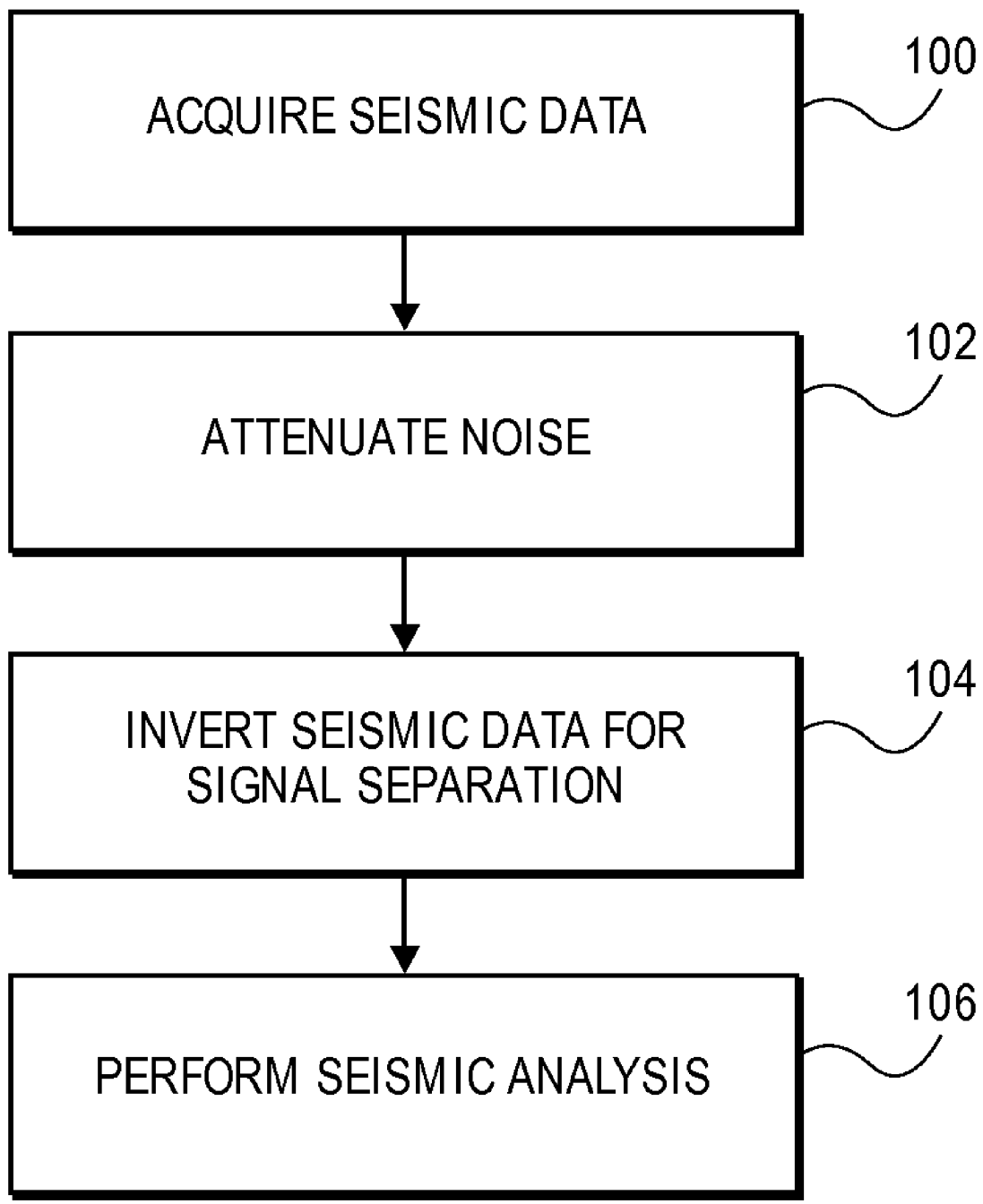
FIG. 21 is a flow chart illustrating some of the steps that can be performed by various embodiments of the present invention.

Referring to FIG. 21, a flowchart of some of the functions that can be performed by embodiments of the present invention is illustrated as steps 100-106. Some of the blocks of the flow chart can represent one or more code segments comprising at least a portion of the computer program. Steps 100-106 can be performed in any order and are not limited to the specific order described herein. Further, steps 100-106 can be performed simultaneously or concurrently such that the steps are not necessarily sequential. Further, steps 100-106 are not each necessarily performed by embodiments of the present invention.

In step 100, the processing system 18 acquires seismic data generated by the seismic system 10. For example, the seismic system 10 can generate seismic data including receiver data corresponding to vibratory signals generated by one more of the sources 12 and detected by at least one of the receivers 14 at a location remote from the sources 12 and source data corresponding to the vibratory signals detected at a location in proximity to the sources 12. The seismic data can include data corresponding to one or more phase-encoded sweeps performed by the seismic system 10 in a manner consistent with high fidelity vibratory source and other multiple source and receiver seismic techniques. Exemplary seismic data including various types of noise are illustrated in FIGS. 5, 11, 14, and 17, as is discussed in more detail below. The acquired seismic data can be represented in any form operable to be utilized by the processing system 18 and is not limited to representing data in a time and amplitude format.

In some embodiments, the processing system 18 can acquire the seismic data by coupling with one or more portions of the seismic system 10, such as one or more of the sources 12 and/or receivers 14. The processing system 18 can also acquire the seismic data by utilizing the memory 24. For example, the memory 24 can be coupled with portions of the seismic system 10 to acquire seismic data therefrom and then transported to the processing system 18 for analysis. The processing system 18 can also acquire the seismic data by accessing the seismic system 10 or other devices through the communications network 20.

In step 102, the processing system 18 attenuates noise present within at least a portion of the receiver data to generate corrected receiver data. "Attenuate," as utilized herein, refers to the at least partial reduction or correction of at least some noise within the receiver data. "Noise," as utilized herein, refers to any anomalous or erroneous data included within the receiver data. For example, the noise operable to be attenuated by embodiments of the present invention can include wind, surface movement, electrical interference from electrical cables, pump noise, ice breaks, ground shifts and roll, time-dependent noise spikes, signal harmonics, culture noise, source-generated noise, combinations thereof, and/or the like.

To attenuate noise within the receiver data, the processing system 18 can employ various noise filters. For example, the processing system 18 can employ a frequency-wavenumber (F-K) filter and/or other dip and pie slice filters to attenuate noise within the receiver data. The processing system 18 can also employ a frequency-space domain (F-X) filter and/or a combination of F-K and F-X filters to attenuate noise present within the receiver data. Various other single and multiple channel filters known in the art, such as median despike, discrete wavelet transforms, and mono-frequency noise attenuation, can also be employed to attenuate additive noise present within the receiver data.

The processing system 18 can also attenuate noise present within the receiver data based upon information acquired through the user interface 26. For example, a user can function the user interface 26 to identify portions of the receiver data for correction and/or manually correct the receiver data utilizing the user interface 26. In some embodiments, the processing system 18 can also receive attenuation instructions through the communications element 28 to enable the attenuation of noise within the receiver data. However, the processing system 18 may employ any methods, filters, and processes to attenuate noise present within at least a portion of the receiver data and embodiments of the present invention are not limited to using the specific filters, methods, and processes discussed above.

The processing system 18 can store the corrected receiver data within the memory 24 for later use and analysis as is discussed in more detail below. The processing system 18 can also provide the corrected data to other devices through the communications network 20 by utilizing the communications element 28.

Figure 6:
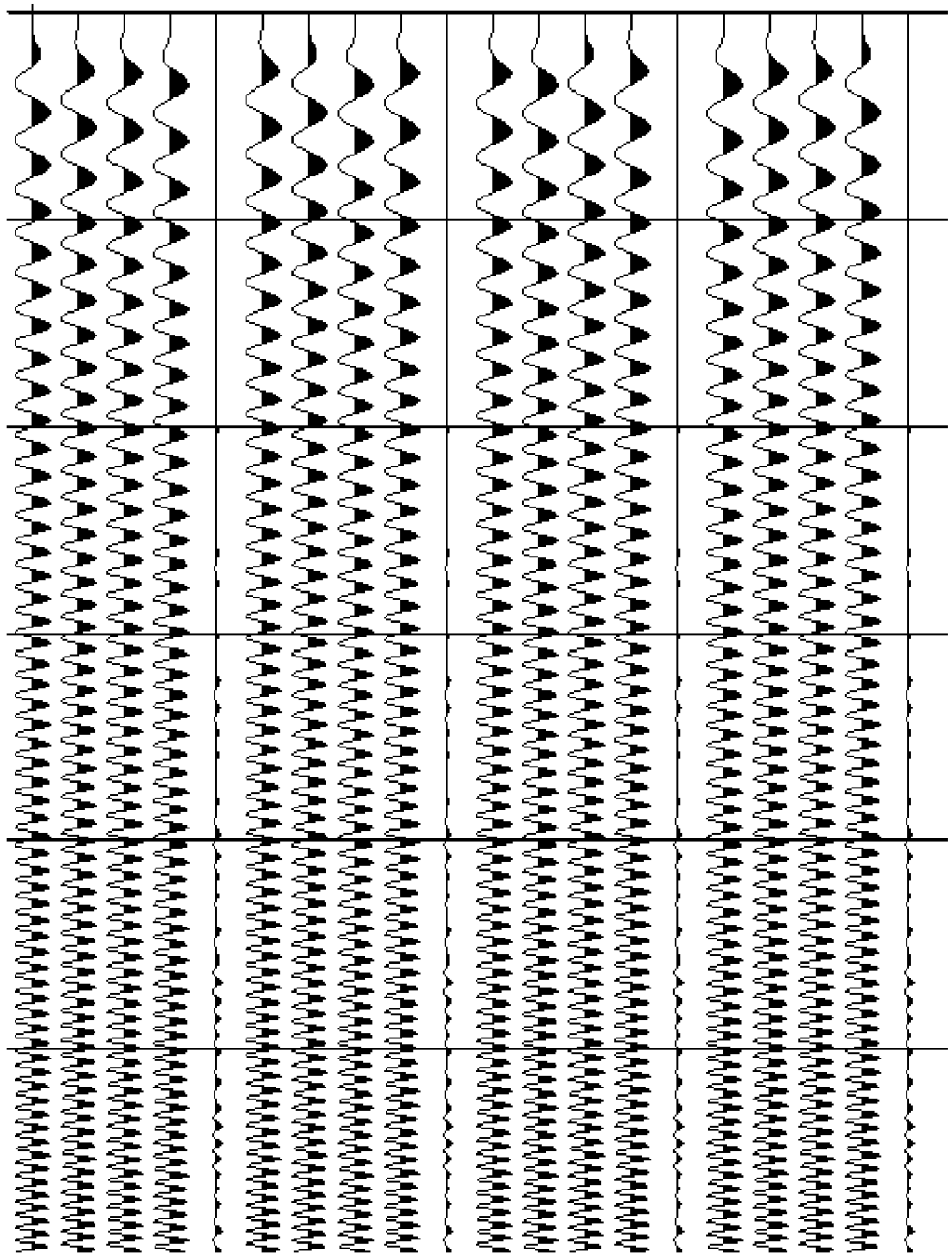
FIG. 6 is the seismic data of FIG. 5 after pre-inversion noise attenuation.
Figure 17:
FIG. 17 is an exemplary seismic data input including an ice break.
Figure 18:
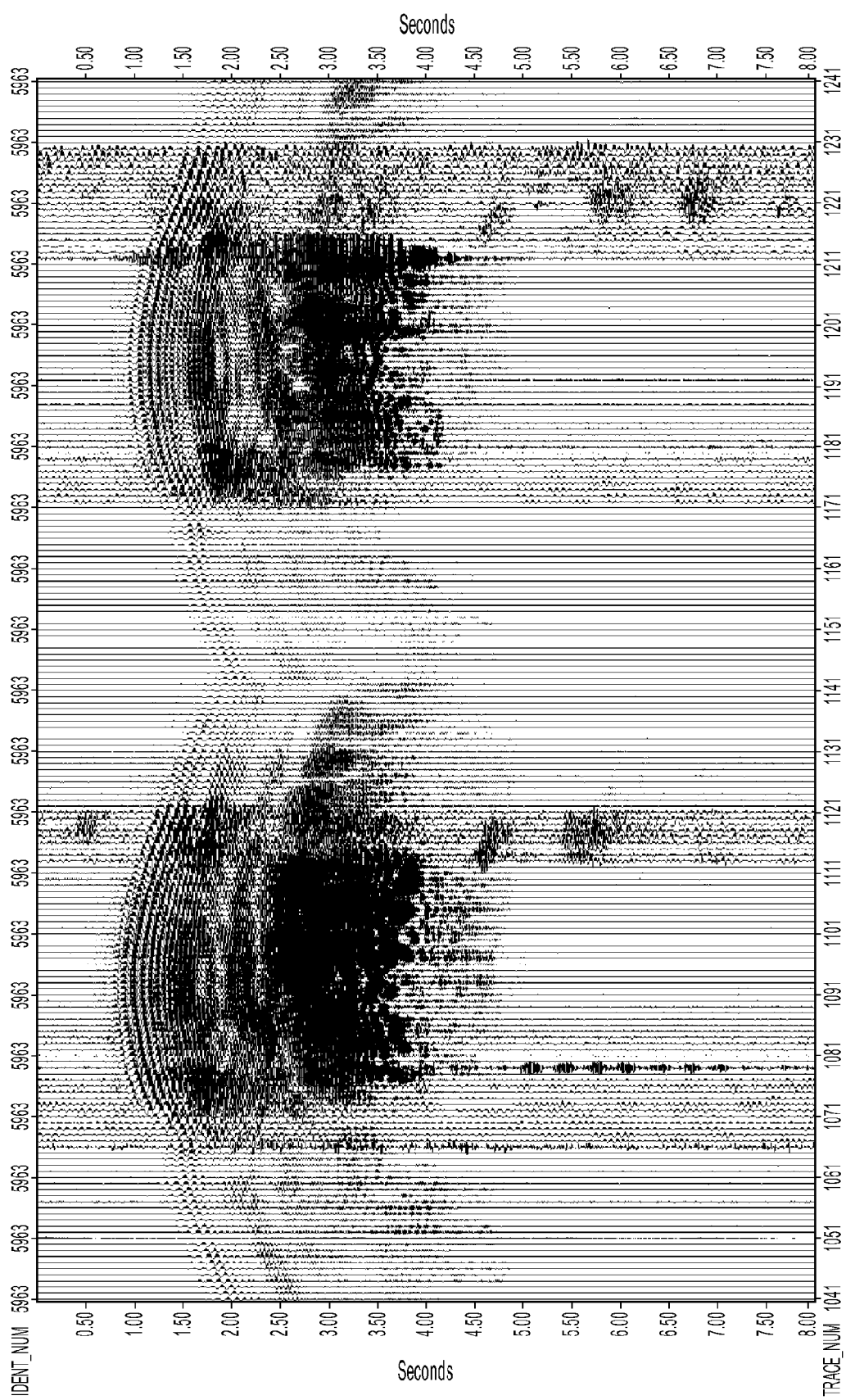
FIG. 18 is the seismic data of FIG. 17 including pre-inversion noise attenuation.

Exemplary pre-inversion attenuation of noise present within receiver data is illustrated in FIGS. 6 and 18. For example, FIG. 6 illustrates the seismic data of FIG. 5 with at least partial pre-inversion attenuation of the 20 Hz noise signal originally present in FIG. 5. FIG. 18 illustrates the seismic data of FIG. 17 with at least partial pre-inversion attenuation of the noise break present in FIG. 17.

In step 104, the processing system 18 inverts the corrected receiver data with the source data to separate the vibratory signals generated by the sources 12 and detected by the receivers 14. The inversion can utilize a M×N matrix:

$$\begin{bmatrix} S_{11} & S_{12} & \ldots & S_{1N} \\ S_{21} & S_{22} & \ldots & S_{2N} \\ & & \ldots & \\ S_{M1} & S_{M2} & \ldots & S_{MN} \end{bmatrix} \begin{bmatrix} h_1 \\ h_2 \\ \ldots \\ h_N \end{bmatrix} = \begin{bmatrix} D_1 \\ D_2 \\ \ldots \\ D_M \end{bmatrix}, \quad (1)$$

where M is the number of recorded traces represented by the seismic data, N is the number of sources 12 with M being greater or equal to N, $S_{MN}$ corresponds to the source data, $D_M$ corresponds to the receiver data, and $h_N$ corresponds to a transfer function associated with the various source-receiver paths as is illustrated in FIG. 1.

If M=N, the system of simultaneous equations given by the above-matrix can be solved in the frequency domain for h:

$$\vec{h} = F \vec{D} \quad (2),$$

where $F=[S]^-$. If M>N, the simultaneous equations given the matrix of (1) can be solved by the method of least squares (e.g., $F=(S^*S)^{-1}S^*$) or by other similar methods and techniques. As should be appreciated, the particular formulation of the M×N matrix, [S], and its inverse can vary based upon the number of sources 12 and receivers 14 (repeated sweeps) employed and the functionality provided by each source 12 and receiver 14.

Utilizing the above, the processing system 18 can solve for the transfer function $h_N$ for each source-receiver path and separate the vibratory signals at selected frequencies represented by the seismic data to facilitate seismic analysis in step 106. In embodiments where the sources 12 generate phase-encoded vibratory signals, the processing system 18 utilizes the phase encoding to facilitate separation of the vibratory signals. As should be appreciated, various separation and matrix inversion techniques are known in the art, each of which can be employed by embodiments of the present invention.

The processing system 18 can store the data corresponding to the matrix inversion performed in step 104 within the memory 24 for later use and analysis as is discussed in more detail below. The processing system 18 can also provide such data to other devices through the communications network 20 by utilizing the communications element 28. In some embodiments, the processing system 18 can present a visual indication of the separated vibratory signals and data associated therewith by utilizing the user interface 26.

Figure 7:
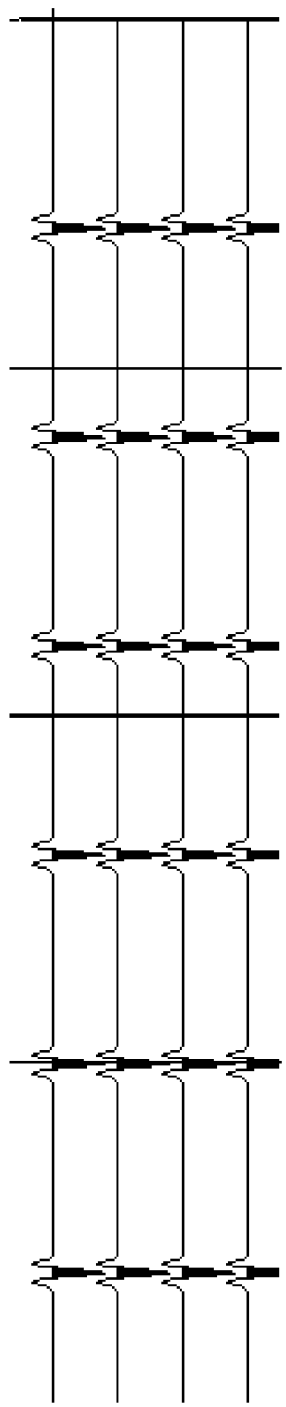
FIG. 7 is an exemplary inversion of the seismic data of FIG. 6.
Figure 8:
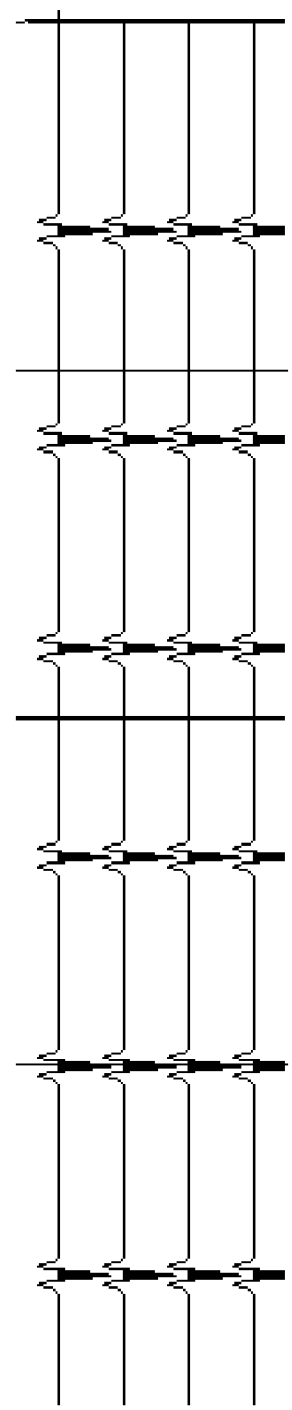
FIG. 8 is an ideal inversion of the seismic data of FIG. 5 without the 20 Hz noise signal.
Figure 9:
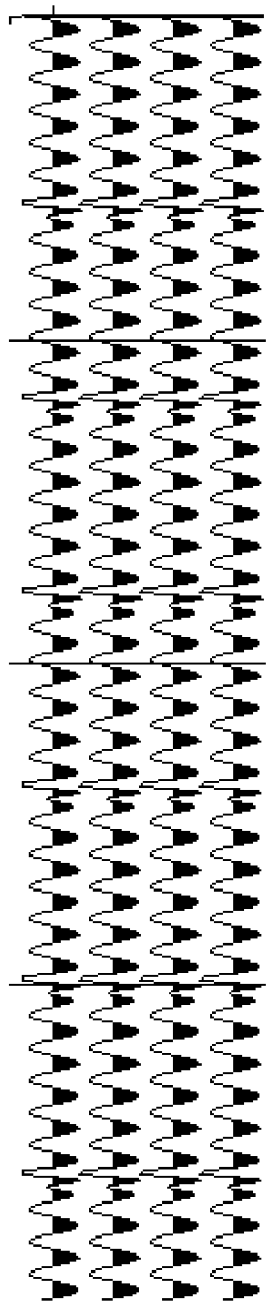
FIG. 9 is an exemplary inversion of the seismic data of FIG. 5 without the pre-inversion noise attenuation of FIG. 6.
Figure 10:
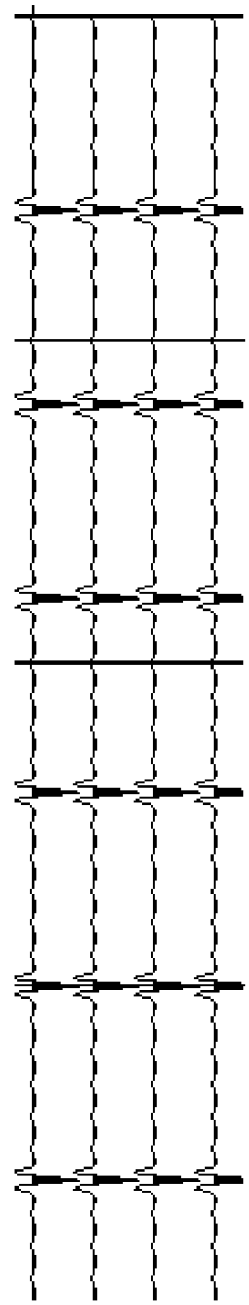
FIG. 10 is an exemplary inversion of the seismic data of FIG. 5 including post-inversion noise attenuation.

Exemplary inversions are illustrated in FIGS. 7-10, 12-13, 15-16, and 19-20. FIG. 8 is an ideal inversion of the seismic data of FIG. 5 without noise being present in the original seismic data. FIG. 7 is an exemplary inversion of the seismic data of FIG. 5 including pre-inversion noise attenuation; FIG. 9 is an exemplary inversion of the seismic data of FIG. 5 without any noise attenuation; and FIG. 10 is an exemplary inversion of the seismic data of FIG. 5 including post-inversion noise attenuation but not pre-inversion noise attenuation. Comparison of FIGS. 7-10 demonstrates that pre-inversion noise attenuation can produce a more ideal result when compared to post-inversion noise attenuation.

Figure 11:
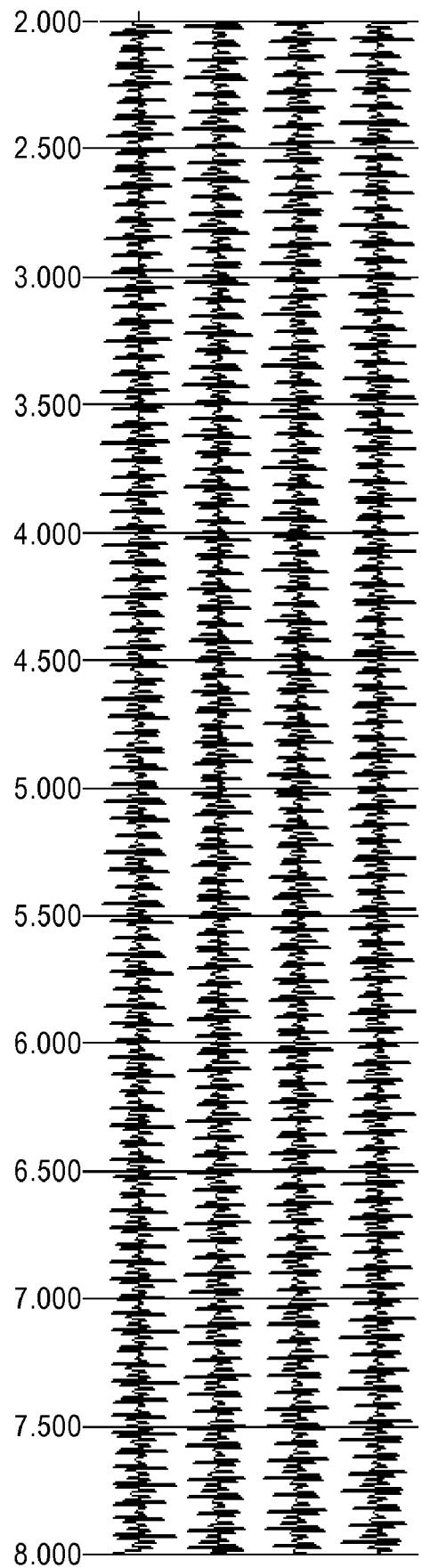
FIG. 11 is exemplary seismic data including a 60 Hz noise signal.

FIG. 12 is an exemplary inversion of the seismic data of FIG. 11 without pre-inversion noise attenuation and with post-inversion noise attenuation, and FIG. 13 is an exemplary inversion of the seismic data of FIG. 11 with pre-inversion noise attenuation. A comparison of FIGS. 12 and 13 demonstrates that pre-inversion noise attenuation can produce a more ideal result when compared to post-inversion noise attenuation. Noticeable improvement can be seen between 0.5 and 0.75 seconds.

Figure 14:
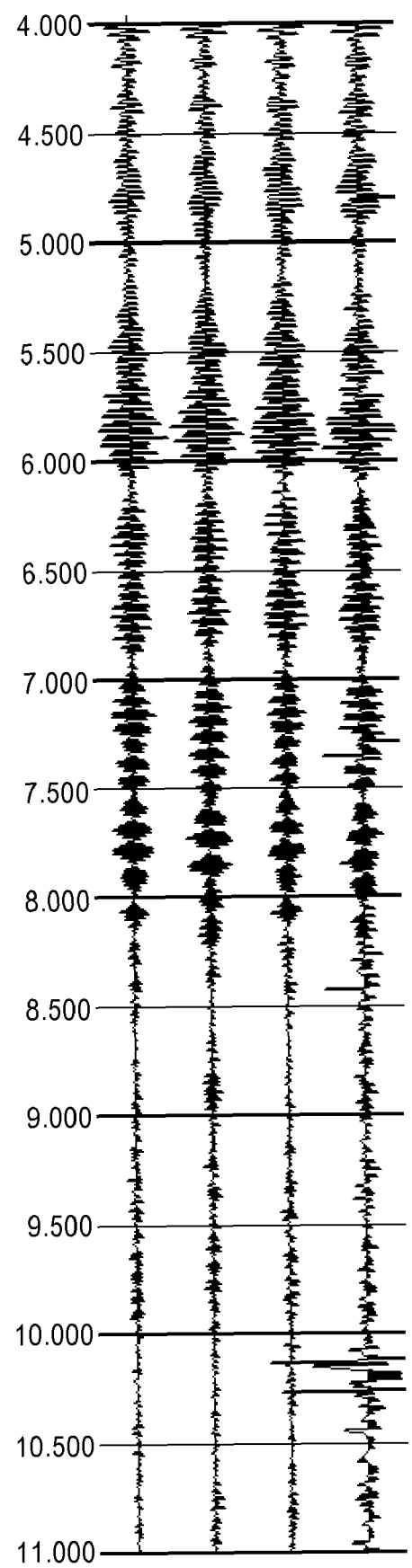
FIG. 14 is exemplary seismic data including noise spikes.

FIG. 15 is an exemplary inversion of the seismic data of FIG. 14 with pre-inversion noise attenuation and FIG. 16 is an exemplary inversion of the seismic data of FIG. 14 without pre-inversion noise attenuation and with post-inversion noise attenuation. A comparison of FIGS. 15 and 16 demonstrates that pre-inversion noise attenuation can produce a more ideal result when compared to post-inversion noise attenuation.

Figure 19:
FIG. 19 is an exemplary inversion of the seismic data of FIG. 18 (with pre-inversion noise attenuation)
Figure 20:
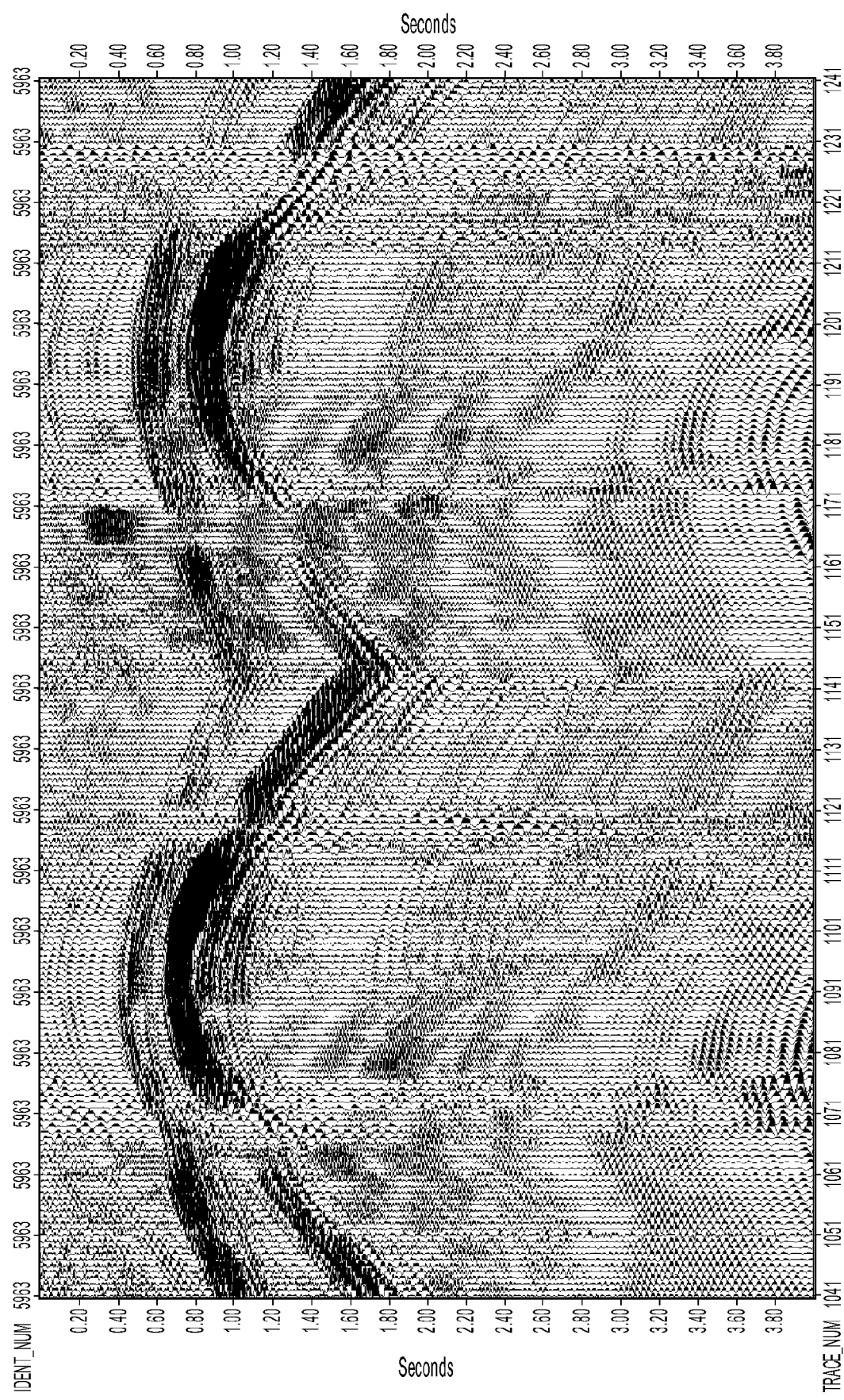
FIG. 20 is an exemplary inversion of the seismic data of FIG. 17 (without pre-inversion noise attenuation)

FIG. 19 is an exemplary inversion of the seismic data of FIG. 17 with pre-inversion noise attenuation and FIG. 20 is an exemplary inversion of the seismic data of FIG. 17 without pre-inversion noise attenuation. A comparison of FIGS. 19 and 20 demonstrates that pre-inversion noise attenuation can produce a more ideal result when compared to data with no noise attenuation.

In step 106, a seismic analysis can be performed utilizing the separation data generated in step 104. For example, a frequency and/or time-domain seismic survey can be generated utilizing the transfer functions $h_N$, and/or data corresponding to signals detected by the receivers 14. Such surveys can be generated utilizing various post-inversion analysis and processing methods, including frequency domain multiplication, inverse discrete Fourier transforms, stacking of cross-correlation records, common depth point (CDP) gathers, normal move-out (NMO) operations and associated corrections, combinations thereof and the like. Additional or alternative post-inversion analysis and processing can also be employed by embodiments of the present invention, including post-inversion noise attenuation for additive and/or convolutional noise types.

As used herein, the terms "a," "an," "the," and "said" means one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "attenuate" mean the at least partial reduction or correction of at least some noise within the receiver data.

As used herein, the term "noise" means any anomalous or erroneous data included within the receiver data that does not correspond to a vibratory signal generated by at least one of the sources 12.

As used herein, the term "simultaneously" means occurring at the same time or about the same time, including concurrently.

What is claimed is:

1. A method for attenuating noise in a multiple source and receiver seismic system, the method comprising:
   (a) acquiring seismic data including receiver data corresponding to vibratory signals simultaneously generated by said multiple sources and detected by at least one of said receivers at a location remote from said sources and source data corresponding to said vibratory signals detected at a location in proximity to said sources;
   (b) attenuating noise present within at least a portion of said receiver data to generate corrected receiver data; and
   (c) inverting said corrected receiver data with said source data to separate said vibratory signals;
   wherein (b) includes applying a single and/or multi-channel filter to said receiver data and wherein said filter includes a median despike filter, a discrete wavelet transform filter, a F-X filter, a F-K filter, and/or combinations thereof.

2. The method of claim 1, further including performing a seismic analysis utilizing said separated vibratory signals.

3. The method of claim 1, further including storing data corresponding to said separated vibratory signals on a computer-readable medium.

4. The method of claim 1, further including presenting a visual indication of said separated vibratory signals.

5. The method of claim 1, wherein said seismic data is acquired by actuating said multiple sources to generate said vibratory signals.

6. The method of claim 1, wherein said seismic data is acquired by accessing a computer-readable medium.

7. A processing system for attenuating noise in a multiple source and receiver seismic system, the processing system comprising:

a memory operable to store seismic data including receiver data corresponding to vibratory signals simultaneously generated by said multiple sources and detected by at least one of said receivers at a location remote from said sources and source data corresponding to said vibratory signals detected at a location in proximity to said sources; and a processor coupled with said memory and operable to:
   acquire said stored seismic data,
   attenuate noise present within said receiver data to generate corrected receiver data, and
   invert said corrected receiver data with said source data to separate said vibratory signals;
wherein said processor is operable to attenuate noise present within said receiver data by applying a single and/or multi-channel filter to said receiver data and wherein said filter includes a median despike filter, a discrete wavelet transform filter, a F-X filter, a F-K filter, and/or combinations thereof.

8. The processing system of claim 7, wherein said processor is further operable to perform a seismic analysis utilizing said separated vibratory signals.

9. The processing system of claim 7, wherein said processor is further operable to store data corresponding to said separated vibratory signals within said memory.

10. The processing system of claim 7, further including a user interface coupled with said processor and operable to present a visual indication of said separated vibratory signals.

11. The processing system of claim 7, further including a user interface coupled with said processor and operable to receive an input from a user and utilize said user input to attenuate noise present within said receiver data.

12. The processing system of claim 7, wherein said memory is a removable memory operable to couple with said multiple sources and receivers to acquire seismic data therefrom.

13. The processing system of claim 7, wherein said processor is operable to couple with said multiple sources and receivers to acquire seismic data therefrom for storage within said memory.

14. A computer program for attenuating noise in a multiple source and receiver seismic system, the computer program stored on a computer-readable medium for operating a processor and comprising:
   a code segment operable to acquire seismic data including receiver data corresponding to vibratory signals simultaneously generated by said multiple sources and detected by at least one of said receivers at a location remote from said sources and source data corresponding to said vibratory signals detected at a location in proximity to said sources;
   a code segment operable to attenuate noise present within said receiver data to generate corrected receiver data; and
   a code segment operable to invert said corrected receiver data with said source data to separate said vibratory signals;
   wherein said code segment attenuates noise present within said receiver data by applying a single and/or multi-channel filter to said receiver data and wherein said filter includes a median despike filter, a discrete wavelet transform filter, a F-X filter, a F-K filter, and/or combinations thereof.

15. The computer program of claim 14, further including a code segment operable to perform a seismic analysis utilizing said separated vibratory signals.

16. The computer program of claim 14, further including a code segment operable to store data corresponding to said separated vibratory signals on said computer-readable medium.

17. The computer program of claim 14, further including a code segment operable to instruct said processor to present a visual indication of said separated vibratory signals.

* * * * *